(12) United States Patent
Ching

(10) Patent No.: US 7,715,660 B2
(45) Date of Patent: May 11, 2010

(54) IMAGE ACQUISITION DEVICE

(75) Inventor: Shih Han Ching, Taipei (TW)

(73) Assignee: Alpha Imaging Technology Corp., Hsin Chu (TW)

( * ) Notice: Subject to any disclaimer, the term of this patent is extended or adjusted under 35 U.S.C. 154(b) by 953 days.

(21) Appl. No.: 11/451,427

(22) Filed: Jun. 13, 2006

(65) Prior Publication Data

US 2007/0285736 A1 Dec. 13, 2007

(51) Int. Cl.
*G06K 7/00* (2006.01)
*H04N 1/40* (2006.01)

(52) U.S. Cl. .................. 382/312; 356/443; 356/448; 356/474

(58) Field of Classification Search ............ 348/333.02, 348/333.12, 183, 184, 207.99, 231.9, 207.2, 348/264, 272, 294, 33.01, 335; 386/124; 358/1.13, 1.14, 1.15, 1.16, 1.1, 474, 475, 358/448, 443, 471; 710/15, 16, 17; 709/208, 709/209, 211, 213, 217; 382/166, 232, 244, 382/312, 305, 307
See application file for complete search history.

(56) References Cited

U.S. PATENT DOCUMENTS 6,289,127 B1 * 9/2001 Ikeda ......................... 382/232
6,480,297 B1 * 11/2002 Suzuki et al. ............... 358/1.16
6,784,941 B1 * 8/2004 Su et al. ..................... 348/445
7,075,573 B2 * 7/2006 Imaeda ................... 348/231.99
7,177,972 B2 * 2/2007 Watanabe ................... 710/313
7,199,829 B2 * 4/2007 Matsui et al. ........... 348/333.02
7,439,707 B2 * 10/2008 Shigeeda .................... 320/106
7,460,254 B2 * 12/2008 Sato et al. .................. 358/1.13
7,502,549 B2 * 3/2009 Suzuki ....................... 386/124

* cited by examiner

*Primary Examiner*—Jerome Grant, II
(74) *Attorney, Agent, or Firm*—Muncy, Geissler, Olds & Lowe, PLLC

(57) ABSTRACT

An image acquisition device capable of accomplishing special-effect processing on real-time motion of the image data in a preview mode is disclosed. The device includes a lens, an optical sensor, an image signal processor, a special-effect processor, a storage unit, and an image display unit. The optical sensor receives an optical signal representing an image through the lens and outputs an electric signal corresponding to the image. The image signal processor couples to the optical sensor for processing the electric signal with a first processing mode and then outputting a raw image data. The special-effect processor couples to the image signal processor for processing the raw image data with a second processing mode and then outputting a processed image data. The storage unit saves the processed image data. The image display unit displays the image based on the processed image data.

10 Claims, 4 Drawing Sheets

IMAGE ACQUISITION DEVICE

BACKGROUND OF THE INVENTION

1. Field of the Invention

The present invention relates to an image acquisition device. More particularly, the present invention relates to an image acquisition device capable of accomplishing special-effect processing on real-time motion of image in preview mode.

2. Description of the Related Art

The components of a conventional image acquisition device 10 are illustrated in FIG. 1. The image acquisition device 10 includes a lens 11, an optical sensor 12, an image signal processor 13, an image parameter adjusting unit 14, a storage unit 15, an image output unit 16, an image display unit 17, and a special-effect processing unit 18. The detail description for these components is as follows.

An optical signal representing an image and passing through the lens 11 is transformed into an electric signal by the optical sensor 12, and the electric signal is further processed in real time by the image signal processor 13 to produce a raw image signal. Then, the image parameter adjusting unit 14 receives the raw image signal, sets parameters of the raw image signal according to the user's setting and generates a target image data. The target image data is then compressed and saved in the storage unit 15 such as a JPG engine, a BMP engine or other unit capable of compressing and saving the image.

After that, the user can display the image saved in the storage unit 15 through the image display unit 17 or output the image saved in the storage unit 15 through the image output unit 16. Further, the user can also accomplish a special-effect processing on the image saved in the storage unit 15 through the special-effect processing unit 18.

As far as the above image acquisition device 10 is concerned, however, the special-effect processing including soft focusing, oil painting, sharpening, etc. is generally performed after the raw image has been compressed and saved but not real-time processed in a preview mode. As a result, the saving of the image which is not accomplished with real-time special-effect processing becomes redundant and causes time, electricity and memory space consuming.

Accordingly, there is a need to provide a friendlier image acquisition device which is able to accomplish a real-time special-effect processing of the image in a preview mode before the image being saved and to achieve the goal of saving the electricity and the memory space.

BRIEF SUMMARY OF THE INVENTION

In view of the above mentioned questions, one object of the present invention is to provide an image acquisition device capable of accomplishing special-effect processing on real-time motion of image in preview mode. In this way, the user can perform the real-time special-effect processing on the raw image data in preview mode without saving the image data in advance and therefore economize the use of memory space and electricity and satisfy the requirement of the user.

The present invention provides an image acquisition device capable of accomplishing special-effect processing on real-time motion of image in preview mode. The image acquisition device includes a lens, an optical sensor, an image signal processor, a special-effect processor, a storage unit, and an image display unit.

The optical sensor receives an optical signal representing an image through the lens and outputs an electric signal corresponding to the image. The image signal processor couples to the optical sensor to process the electric signal in real time (or with a first processing mode) and then outputs a raw image data. The special-effect processor couples to the image signal processor for processing the raw image data in preview mode (or with a second processing mode) and outputs an outputted image data. The storage unit saves the outputted image data from the special-effect processor. The image display unit displays the image based on the outputted image data.

The image acquisition device according to the present invention is able to accomplish real-time special-effect processing of the raw image data in preview mode so that the goal of "what you see is what you get" can be achieved and the saving of the image data before the image data is modified or adjusted can be omitted to avoid time and electricity consuming. Therefore, the user can perform the real-time special-effect processing on the raw image data in preview mode without saving the image data in advance and therefore economize the use of memory space and electricity and satisfy the requirement of the user.

DETAILED DESCRIPTION OF THE INVENTION

Reference will now be made to the drawings in which the various elements of the present invention will be given numerical designations and in which the invention will be discussed so as to enable one skilled in the art to make and use the invention.

Figure 1:
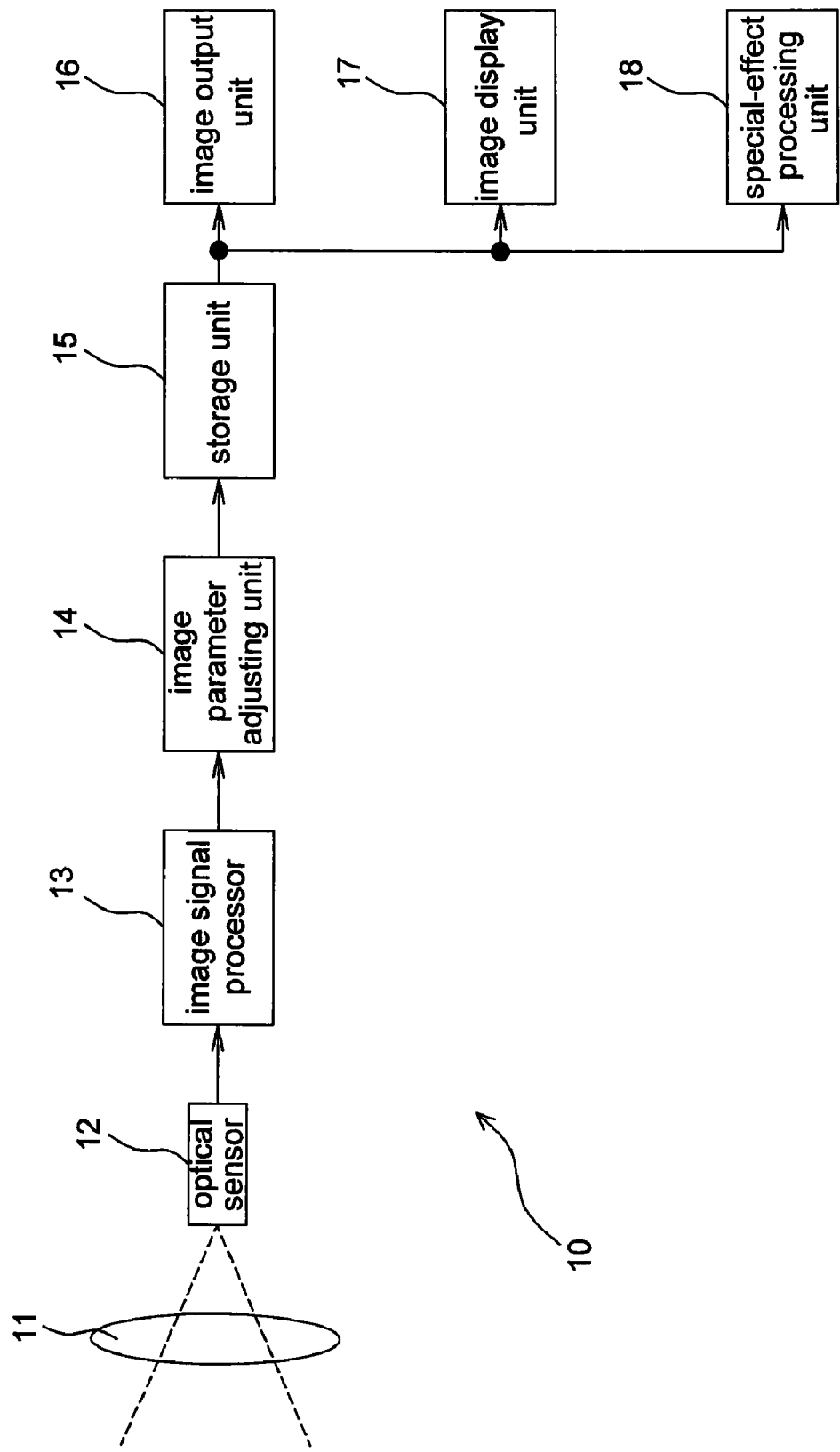
FIG. 1 shows a schematic diagram of a conventional image acquisition device.
Figure 2:
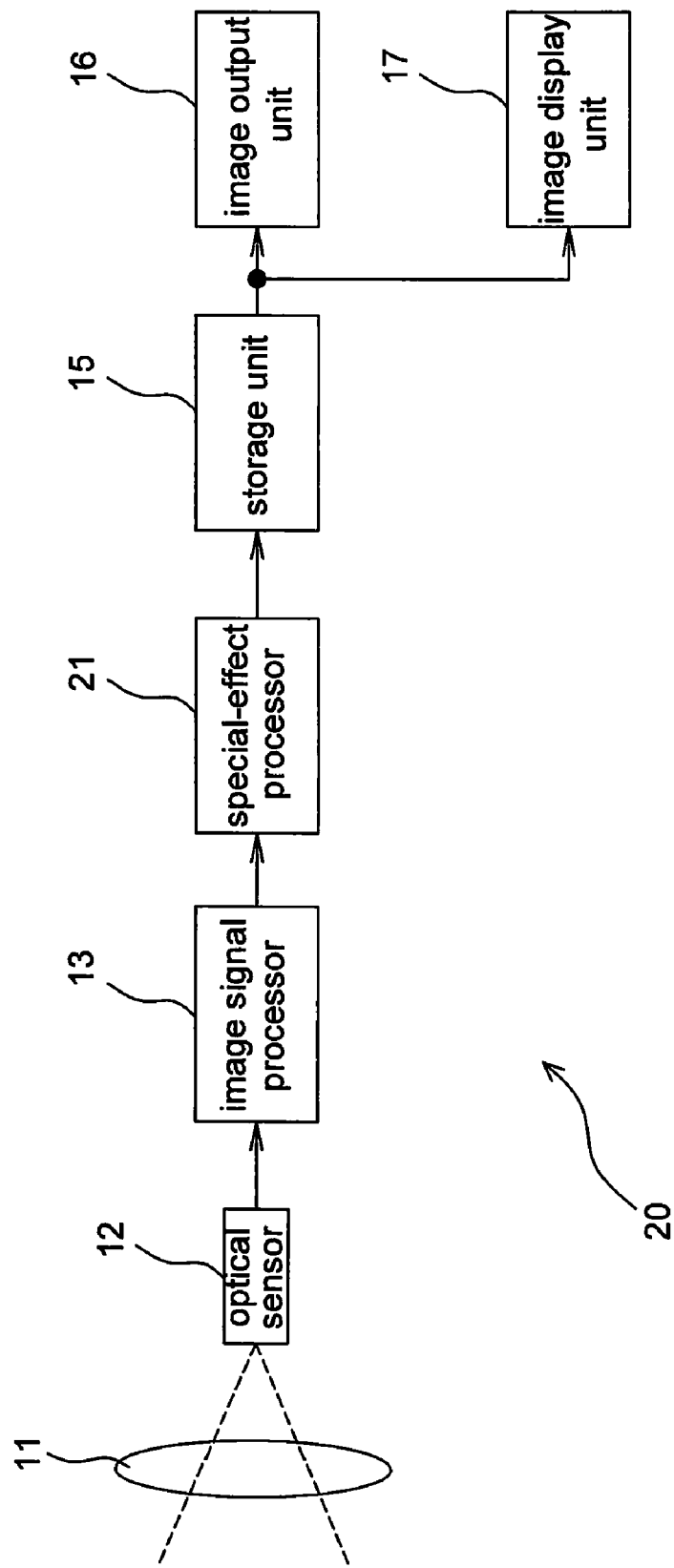
FIG. 2 shows a schematic diagram of an image acquisition device according to one embodiment of the prevent invention.

Referring to FIG. 2, an image acquisition device 20 capable of accomplishing special-effect processing on real-time motion of image in preview mode is illustrated. The device 20 includes a lens 11, an optical sensor 12, an image signal processor 13, a special-effect processor 21 such as a preview reshaping engine, a storage unit 15, an image output unit 16 and an image display unit 17.

The optical sensor 12 receives an optical signal representing an image through the lens 11 and outputs an electric signal corresponding to the image. The image signal processor 13 couples to the sensor 12 to process the electric signal in real time (or with a first processing mode) and then outputs a raw image data (or a first image data). The special-effect processor 21 couples to the image signal processor 13 for processing the raw image data (or a first image data) in the preview mode (or with a second processing mode), and outputs an outputted image data. Specifically, in the preview mode, the raw image data (or a first image data) can be modified or adjusted in real time according to the user's setting and then be outputted to be the outputted image data which is an image data of special-effect (or a second image data). The storage unit 15 saves the outputted image data (or a second image data) from the special-effect processor 21. Subsequently, the user can display the image based on the outputted image data (or a second image data) by using the image display unit 17 or output the outputted image data (or a second image data), which saved in the storage unit 15, by the image output unit 16 to an extra image display unit.

In this embodiment, the storage unit 15 directly saves the outputted image data (or a second image data) from the special-effect processor 21. Alternatively, the storage unit 15 may save the outputted image data (or a second image data) that has been compressed by a compressing unit (not shown).

Figure 3:
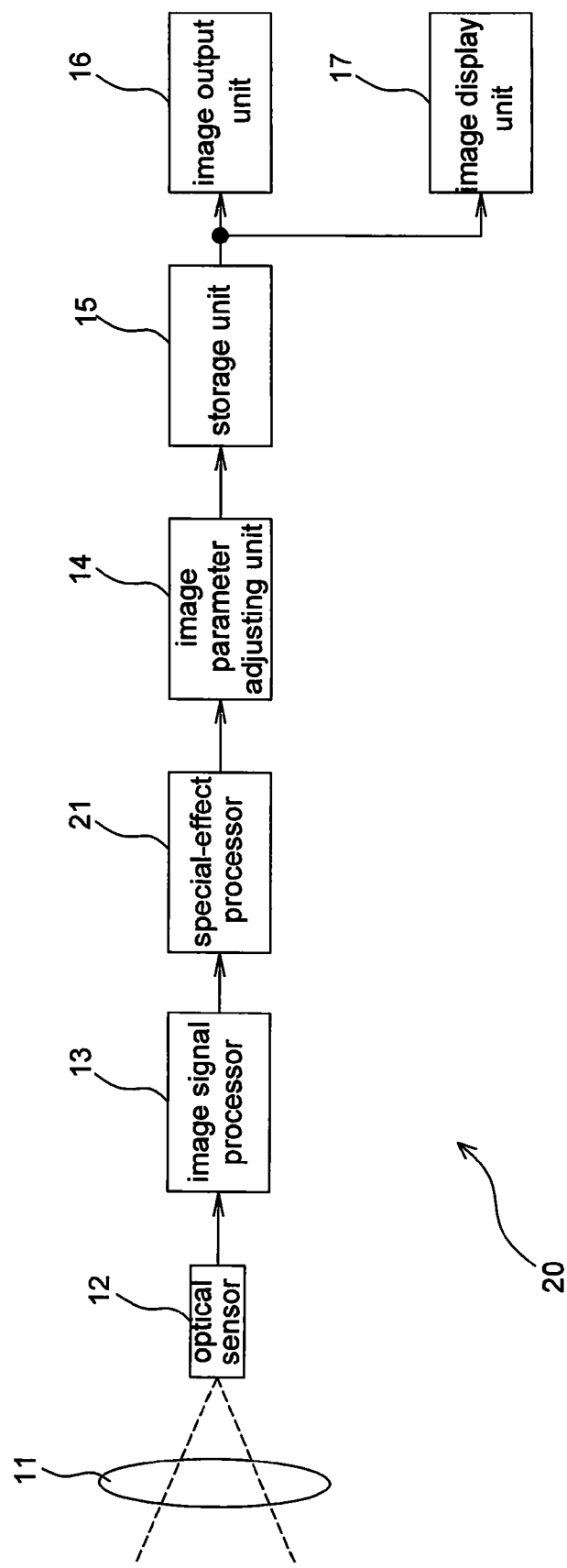
FIG. 3 shows a schematic diagram of an image acquisition device according to another embodiment of the prevent invention.

Referring to FIG. 3, the image acquisition device 20 can further include an image parameter adjusting unit 14 for receiving the outputted image data outputted by the special-effect processor 21, enabling the parameter adjustment of the outputted image data and then outputting an adjusted image data to the storage unit 15.

Comparing with the prior image acquisition device 10, the image acquisition device 20 according to the present invention is able to accomplish real-time special-effect processing of the raw image data (or a first image data) in preview mode so that "what you see is what you get" can be achieved and the saving of the image data before the image data is modified or adjusted can be omitted to avoid time and electricity consuming.

The special-effect processor 21 generates the outputted image data (or a second image data) by using a real-time reshape algorithm to change the pixel position of the raw image data (or a first image data). In addition, the special-effect processor 21 accomplishes adjustment of the pixel position and the color property of the outputted image data (or a second image data) by involving a color property adjusting technology.

Herein, the special-effect processor 21 is appeared to be in form of any one of firmware, hardware, and firmware together with hardware. The special-effect processor 21 accomplishes processing of special-effect including soft focusing, framing, printing, scaling, sketching, antiquating, oil painting, sharpening, carving, spraying and the combination thereof. The special-effect processor 21 also accomplishes real-time reshape on the raw image data (or a first image data) and then outputs the outputted image data (or a second image data) for a dynamic image playing and further incorporates sound-effect with the dynamic image playing.

Figure 4:
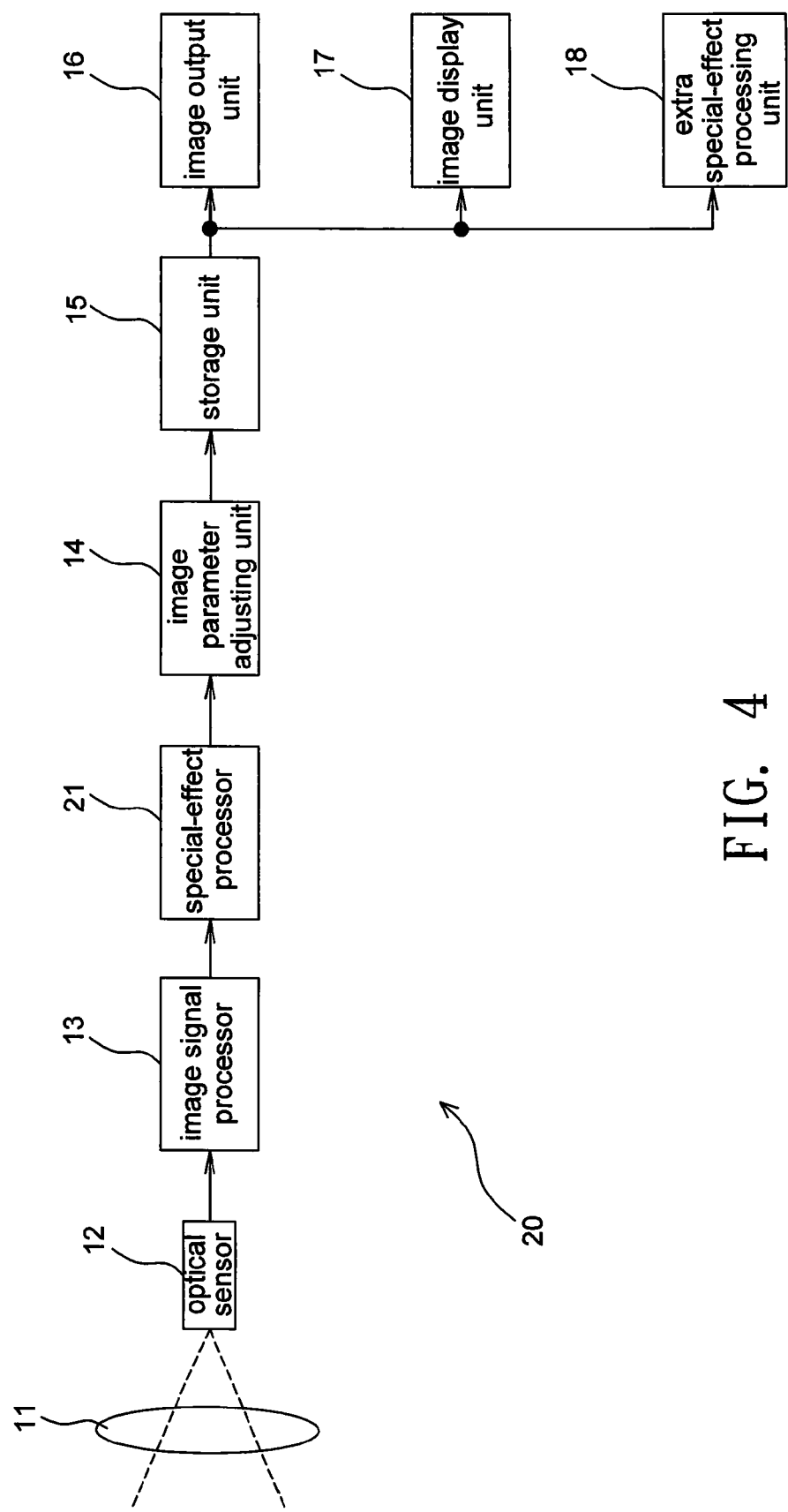
FIG. 4 shows a schematic diagram of an image acquisition device according to another embodiment of the prevent invention.

Referring to FIG. 4, the image acquisition device 20 according to the prevent invention can further include an extra special-effect processor 18 to accomplish further special-effect processing on the saved image data.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An image acquisition device comprising:
    a lens;
    an optical sensor for receiving, through the lens, an optical signal which represents an image and outputting an electric signal corresponding to the image;
    an image signal processor coupled to the optical sensor for processing the electric signal with a first processing mode and outputting a first image data;
    a special-effect processor coupled to the image signal processor for generating a second image data by using a real-time reshape algorithm to change a pixel position of the first image data and outputting the second image data;
    a storage unit for saving the second image data; and
    an image display unit for displaying the image based on the second image data.

2. The image acquisition device according to claim 1, further comprising an image output unit for outputting the second image data saved in the storage unit to an extra image display unit.

3. The image acquisition device according to claim 1, further comprising an image parameter adjusting unit for receiving the second image data outputted by the special-effect processor and enabling the parameter adjustment of the second image data and then outputting the adjusted second image data to the storage unit.

4. The image acquisition device according to claim 1, further comprising an extra special-effect processor for accomplishing further special-effect processing on the saved second image data.

5. The image acquisition device according to claim 1, wherein the second image data is compressed by a compressing unit before being saved in the storage unit.

6. The image acquisition device according to claim 1, wherein the special-effect processor accomplishes adjustment of the pixel position and the color property of the second image data by involving a color property adjusting technology.

7. The image acquisition device according to claim 1, wherein the special-effect processor is appeared to be in form of any one of firmware, hardware and firmware together with hardware.

8. The image acquisition device according to claim 1, wherein the special-effect processor accomplishes processing of special-effect including soft focusing, framing, printing, scaling, sketching, antiquating, oil painting, sharpening, carving, spraying and the combination thereof.

9. The image acquisition device according to claim 1, wherein the special-effect processor accomplishes real-time reshape on the first image data and outputs the second image data of special-effect for a dynamical image playing.

10. The image acquisition device according to claim 9, wherein the special-effect processor incorporates sound-effect with the dynamic image playing.

* * * * *